United States Patent [19]

Fillery

[11] 4,034,937

[45] July 12, 1977

[54] POSITION REFERENCE DEVICES

[75] Inventor: William James Fillery, Belfast, Northern Ireland

[73] Assignee: Short Brothers & Harland Limited, Belfast, Northern Ireland

[21] Appl. No.: 629,962

[22] Filed: Nov. 7, 1975

[30] Foreign Application Priority Data

Nov. 12, 1974 United Kingdom ............. 48929/74

[51] Int. Cl.² ........................................ G01P 15/02
[52] U.S. Cl. .............................. 244/3.21; 244/3.2; 73/516 LM
[58] Field of Search .................. 244/3.2, 3.21, 164, 244/171; 73/505, 516 LM, 517 A

[56] References Cited

U.S. PATENT DOCUMENTS

| 2,370,000 | 2/1945 | Best ................................. 73/517 A |
| 2,949,782 | 8/1960 | Stedman .............................. 73/505 |
| 3,564,928 | 2/1971 | Slater et al. .................. 73/516 LM |
| 3,948,107 | 4/1976 | Asmar et al. .................. 73/516 LM |

Primary Examiner—Verlin R. Pendegrass
Attorney, Agent, or Firm—Cushman, Darby & Cushman

[57] ABSTRACT

The invention provides an angular position reference device for measuring changes in the attitude of a moving body and comprising a closed chamber filled with a liquid and rotatable about an axis by drive means, and position sensing means such as a vane assembly mounted within the chamber for rotation with the liquid independently of the chamber about an axis coaxial with the chamber axis and which, with the liquid, defines a reference position fixed in space in a plane normal to said axis, and which co-operate with the chamber to define a datum position of the chamber relatively to the reference position, in use, rotation of the chamber about said axis tending to cause relative rotation between the chamber and the liquid from said datum position which is sensed by the position sensing means which produces an output proportional to said rotation, said output so controlling the drive means to rotate the chamber to return the chamber to the datum position and, in use, providing a measure of a change in the position of a body to which the device is connected about said axis relatively to the reference position.

11 Claims, 2 Drawing Figures

POSITION REFERENCE DEVICES

The invention relates to angular position reference devices.

In all moving bodies, such as guided missiles, it is essential that the roll angle is known at all time. The usual method of measuring the angle uses an electrical pick-off from a free or integrating rate gyroscope. In small missiles the design of gyroscopes to meet the very quick start and high longitudinal acceleration requirements becomes increasingly difficult as the size of the missile reduces. In addition, the nutation and precession together with drift due to windage, gimbal and take-off friction, gimbal imbalance and gimbal distortion under high acceleration can affect the accuracy of these devices.

It is an object of the invention to provide a position reference device for measuring, for example, roll angle in which these disadvantages are mitigated.

Accordingly, the invention provides an angular position reference device for measuring changes in the attitude of a moving body and comprising a closed chamber filled with a liquid and rotatable about an axis by drive means, and position sensing means mounted within the chamber for rotation with the liquid independently of the chamber about an axis co-axial with the chamber axis and which, with the liquid, defines a reference position fixed in space in a plane normal to said axis, and which co-operate with the chamber to define a datum position of the chamber relatively to the reference position, in use, rotation of the chamber about said axis tending to cause relative rotation between the chamber and the liquid from said datum position which is sensed by the position sensing means which produces an output proportional to said rotation, said output so controlling the drive means to rotate the chamber to return the chamber to the datum position and, in use, providing a measure of a change in the position of a body to which the device is connected about said axis relatively to the reference position.

Preferably the position sensing means comprise a vane assembly pivoted within the chamber for free rotation relatively to and about the axis of the chamber.

The vane assembly may be symetrically disposed about its pivotal axis. The vane assembly may be arranged to take up a reference position related to the earth's magnetic field. In either of these cases the density of the vane assembly is preferably the same as the density of the liquid.

Alternatively the vane assembly may be arranged eccentrically about the pivotal arms to form a pendulum so that the reference position defined thereby is related to the direction of gravity with the density of the liquid different to the density of the vane assembly.

Preferably the position sensing means further comprises a light source directed towards a photo-electric cell with the light path therebetween passing through the liquid, the vane assembly interrupting the patch by an amount which is a function of the rotation of the chamber relative to the datum position, whereby the photo-electric cell produces an output signal which is dependant on said rotation and which is used to operate said drive means.

The light source and photo-electric cell are preferably one of two such light sources and photo-electric cells, the light path of one light source being interrupted by the vane assembly to a greater extent as the light path of the other light source is interrupted to a lesser extent so that both photo-electric cells produce signals which are a function of the position of the chamber relatively to the datum position.

The vane assembly may include a shaped mask which interrupts the light path.

The drive means preferably comprise an electric motor with the armature of the motor connected to and co-axial with the chamber.

The chamber may be rotatable by the drive means about one or more further axes, said further axis or axes being transverse to the firstmentioned axis, the position sensing means being mounted within the chamber for rotation with the liquid about one or more further axes, the or each of which axes being co-axial with and corresponding to the or one of the chamber axes, the position sensing means, for the or each further axis, defining a further reference position fixed in space in a plane normal to the or each further axis and co-operating with the chamber to define a datum position of the chamber relatively to the or each reference position rotation of the chamber about the or each further axis tending to cause relative rotation between the chamber and the liquid from the corresponding datum position which is sensed by the position sensing means which produces a further output dependant on said rotation about the or each further axis, the or each said further output so controlling the drive means to rotate the chamber about the or each further axis to return the chamber to the or each further datum position, and, in use, providing a measure of a change in the position of the body about the or each further axis relatively to the or each further reference position.

The following is a more detailed description of one embodiment of the invention, by way of example, reference being made to the accompanying drawings in which.

Figure 1:
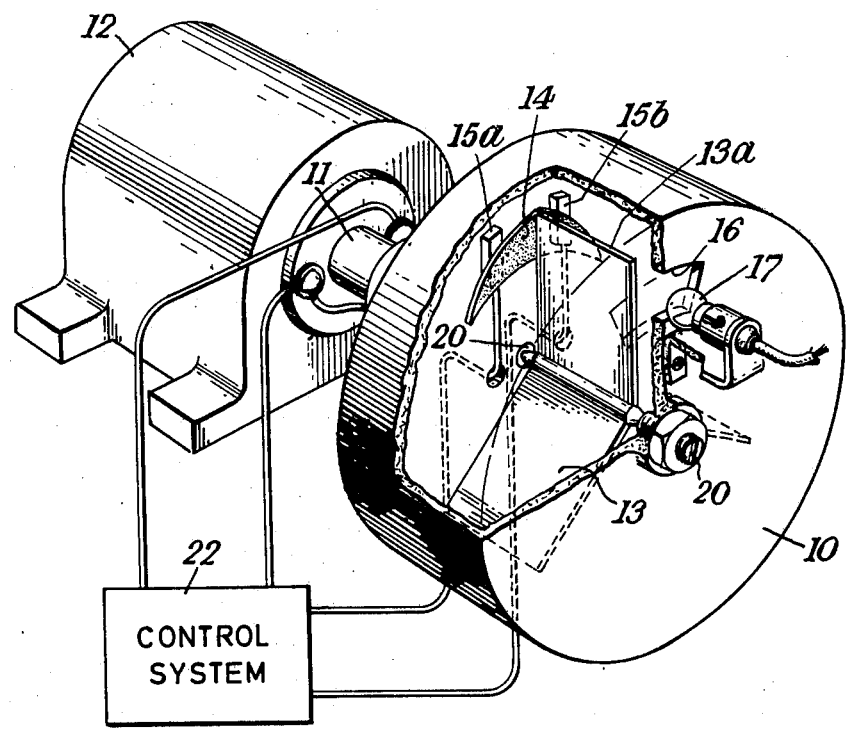
FIG. 1 is a perspective view, partially in section, of a position reference device.

The position reference device as shown in FIG. 1 comprises a closed cylindrical chamber 10 completely filled with a liquid of low viscosity. The chamber 10 is rigidly connected to the armature 11 of an electric motor 12 with the axis of the armature 11 co-axial with the axis of the chamber 10.

A position sensing means comprises a vane assembly 13 mounted for free rotation on pivots 20 within the chamber 10 about an axis co-axial with the axis of the chamber 10. The vane assembly 13 is symmetrical about its rotational axis. One of the vanes 13a carries a mask 14 of lunette shape, the two ends of which lie adjacent two photo-electric cells 15a, 15b in one end surface of the chamber 10. An arcuate window 16 is provided in the other end surface of the chamber 10 opposite the cells 15a, 15 b. A light source 17 is arranged to shine through this window, past the mask 14 to the photo-electric cells 15a, 15b. The output of the photo-electric cells 15a, 15b is fed to the motor 12 by way of a control system 22.

Figure 2:
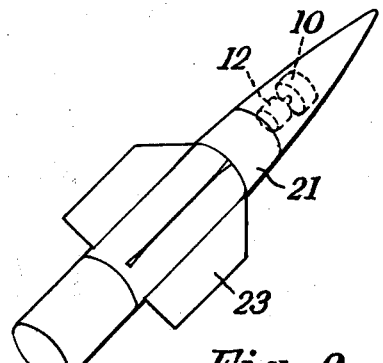
FIG. 2 is a perspective view of a guided missile including the position reference device.

In use, the motor is connected to the body of a guided missile 21 (FIG. 2), for example, with the axis of the chamber 10 co-axial with the longitudinal axis of the guided missile 21.

When the missile 21 is steady about its roll axis the photoelectric cells 15a, 15b will give equal outputs representing a reference position fixed in space a plane normal to the roll axis of the missile and also representing a datum position of the chamber 10 relatively to the liquid and vane assembly 13. In this position it is arranged that the control system 22 does not supply any current to the electric motor 12.

When the missile 21 rolls about its longitudinal axis, the chamber 10 moves away from the datum position and the outputs of the two photo-electric cells 15a, 15b differ. The difference signal is used by the control system to activate the electric motor 12 and rotate the armature 11 to return the chamber 10 to the datum position. It will be appreciated that this difference signal also represents the movement of the guided missile from the reference position defined by the vane assembly 13 and thus can be used in the guidance of the missile by control of wings 23 of the missile 21.

The effect is that the missile can be rolled at will but the chamber 10 and vane assembly 13 maintain a fixed orientation in space. There is not tendency for the liquid to be dragged around by the chamber 10 because it does not rotate. The missile roll angle can easily be measured between the chamber and the missile body. Any torque on the system due to pick-off or slip-rings is readily overcome by the motor 12.

If the density of the vane assembly 13 is made exactly equal to the liquid in which it is suspended, then, when stationary, no load is transmitted to the pivots 20. When a linear acceleration is applied to the unit a differential pressure is built up in the fluid which transmits the accelerating force to the vane assembly 13 leaving the pivots 20 carrying no load as before. In practice, of course, perfection is not possible but very light and delicate pivots could be used.

If it is found desirable the vane assembly 13 could be made very slightly pendulous with the density of the liquid slightly different to the density of the vane assembly to achieve pendulousness. A period of tens of seconds could readily be achieved with high damping. The errors produced during a typical missile firing would be small provided that a lateral acceleration in one direction is not sustained for long periods. Alternatively, the vane assembly 13 could be arranged to assume a fixed reference position relatively to the earth's magnetic field, or any other long term monitoring system conventionally used in gyroscopes.

The optical pick-off which has been used to measure angular discrepancies between the vanes and the chamber 10 is not the only way to measure the angles and any suitable arrangement could be used.

The same point applies to the electric motor; any device which can produce the required torque could be used.

It will further be appreciated that the arrangement described above with reference to the drawings could be used to measure angular movement in the pitch or yaw planes. Alternatively, a spherical chamber could be used with the vane assembly mounted on gimbals and the chamber movable in three mutually perpendicular planes. Three light sources and photo-electric cell arrangements would be used in this case to measure movements in roll, pitch and yaw planes.

What we claim is:

1. An angular position reference device for measuring angular changes in the attitude of a moving body and comprising:
    a drive means for connection to the moving body;
    a closed chamber carried by the drive means for rotation thereby about an axis of rotation;
    a liquid filling the chamber and forming an inertial mass;
    a liquid position sensing means mounted within the chamber for rotation independently of the closed chamber about an axis co-axial with the axis of the closed chamber whereby the liquid position sensing means maintains a fixed position relative to the liquid inertial mass and defines a reference position of the liquid inertial mass fixed in space in a plane normal to the axis of rotation of the closed chamber;
    a measuring means measuring changes in the relative angular positions of the liquid inertial mass and the moving body and the drive means in said plane normal to the axis of the closed chamber by measuring changes in the relative angular positions of the liquid position sensing means and the closed chamber from a datum position,
    said measuring means producing an output which is a function of said relative movement and which is applied to the drive means to rotate the closed chamber about its axis relative to the body and restore the liquid position sensing means and the chamber to the datum position whereby the relative rotation between the closed chamber and the liquid inertial mass is reduced to a minimum to prevent drag between the closed chamber and the liquid inertial mass,
    said output also providing a measure of said change in the angular position of the body from the reference position in space.

2. A device as claimed in claim 1 wherein the position sensing means comprise a vane assembly pivoted within the closed chamber for free rotation relatively to and about the axis of the chamber.

3. A device as claimed in claim 2 wherein the vane assembly is symetrically disposed about its pivotal axis.

4. A device according to claim 3 wherein the density of the vane assembly is the same as the density of the liquid.

5. A device as claimed in claim 2 wherein the vane assembly is arranged to take up a reference position related to the earth's magnetic field.

6. A device as claimed in claim 5, wherein the density of the vane assembly is the same as the density of the liquid.

7. A device as claimed in claim 2 wherein the vane assembly is arranged accentrically about the pivotal axis to form a pendulum so that the reference position defined thereby is related to the direction of gravity, and wherein the density of the liquid is different to the density of the vane assembly.

8. A device as claimed in claim 2 wherein the measuring means comprises a light source directed towards a photo-electric cell with the light path therebetween passing through the liquid, the vane assembly interrupting the path by an amount which is a function of the rotation of the chamber relative to the datum position, whereby the photo-electric cell produces an output signal will is a function of said rotation and which is used to operate said drive means.

9. A device as claimed in claim 6 wherein the light source and photo-electric cell are one of two such light sources and photo-electric cells, the light path of one light source being interrupted by the vane assembly to a greater extent as the light path of the other light source is interrupted to a lesser extent so that both photo-electric cells produce signals which are dependant on the position of the chamber relatively to the datum position.

10. A device as claimed in claim 6 wherein the vane assembly includes a shaped mask which interrupts the light path.

11. A device as claimed in claim 1 wherein the drive means comprise an electric motor with the armature of the motor connected to and co-axial with the chamber.

* * * * *

Disclaimer 4,034,937.—*William James Fillery*, Belfast, Northern Ireland. POSITION REFERENCE DEVICES. Patent dated July 12, 1977. Disclaimer filed July 6, 1978, by the assignee, *Short Brothers Limited*.

Hereby enters this disclaimer to all claims of said patent.

[*Official Gazette August 29, 1978.*]